Patented Nov. 14, 1950

2,529,512

UNITED STATES PATENT OFFICE 2,529,512

UNSATURATED ALKYD FOAM RESINS

John B. Ott, Dayton, Ohio, assignor to Monsanto Chemical Company, St. Louis, Mo., a corporation of Delaware No Drawing. Application May 4, 1948, Serial No. 25,093

9 Claims. (Cl. 260—2.5)

This invention relates to porous, cellular or foam resins. More particularly, the invention relates to unsaturated polyester foam resins and to foaming or blowing agents therefor.

Cellular or porous resins are made by processes long known to the rubber industry for producing rubber articles termed variously as foam, porous, cellular or sponge rubber. The processes include (1) incorporating a water-soluble material having a discrete particle size in the resin and then dissolving the water-soluble material from the resin, (2) the introduction of an inert gas into the resin in a confined space under pressure and then suddenly removing the pressure, (3) the incorporation into the resins of material which decompose under specific conditions to yield a large volume of inert gas, or (4) the use of very volatile solvents which are very rapidly removed from the resins at elevated temperatures and reduced pressures.

Porous or cellular resins made by these processes have been brittle, non-uniform and insufficiently low in density.

An object of this invention is to provide foam resins.

A further object is to provide new foaming agents.

Another object is to provide porous or cellular unsaturated polyester resins.

These and other objects are attained by using monoacyl azides as foaming agents in unsaturated polyester resins.

The following examples are given in illustration and are not intended as limitations on the scope of this invention. Where parts are mentioned, they are parts by weight.

Example I

An unsaturated polyester resin was prepared by condensing together at elevated temperature 295 parts (2 mols) of phthalic anhydride, 685 parts (7 mols) of maleic anhydride, 560 parts (9 mols) of ethylene glycol, 29 parts (0.5 mol) of allyl alcohol and 37 parts (0.5 mol) of butanol to obtain a liquid resin having an acid number of about 30–35. During the condensation reaction, nitrogen was blown through the reaction vessel to aid in the removal of water and to eliminate oxygen from the vessel. 560 parts (2.3 mols) of diallyl phthalate were mixed with the liquid resin.

Example II 1 part of di(tertiary butyl) peroxide, 1 part of cinnamoyl azide and 0.1 part of soya lecithin were thoroughly mixed with 100 parts of a resin mixture made by the process shown in Example I. The mixture was then heated at about 165° C. for about 25 minutes to produce a hard, uniform, closed cell foam having a density of about 0.25 g./cm.$^3$.

Example III 1 part of di(tertiary butyl) peroxide, 5 parts of furoyl azide, 5 parts of foliated glass fines, 0.1 part of soya lecithin and 0.002 part of p-quinone were thoroughly mixed with 100 parts of a liquid resin mixture produced by the method shown in Example I. The mixture was then heated at about 165° C. for about 15 minutes. A soft uniform foam having a density of about 0.055 g./cm.$^3$ was obtained.

Example IV

A polyester resin was prepared by condensing the following ingredients at elevated temperatures in an inert atmosphere to an acid number of about 30.

| | Mols |
|---|---|
| Maleic anhydride | 1.2 |
| Tetrachloro phthalic anhydride | 1.75 |
| Adipic acid | 0.35 |
| Oleic acid | 0.09 |
| Ethylene glycol | 2.7 |
| Diethylene glycol | 0.7 |

100 parts of this resin were thoroughly mixed with 15 parts of diallyl phthalate, 2 parts of di(tertiary butyl) peroxide, 1.5 parts of furoyl azide, 1 part of aluminum laurate, 0.05 part of soya lecithin and 0.007 part of picric acid. The mixture was then heated at about 125° C. for about 100 minutes. The resultant foam was rigid, tough, uniform in cell size and had a density of about 0.15 g./cm.$^3$. The foam had a compressive strength of 80–120 p. s. i. and a modulus of compression of 2500 p. s. i.

The polyester resins useful in the process of this invention are unsaturated resins to which a small amount of a polymerizable monomer has been added. The resins may be cured by the application of heat in the presence of polymerization catalysts.

Basically the polyester resins of this invention may be made by condensing together at elevated temperatures a dihydric alcohol with an unsaturated dibasic acid using molecular equivalent proportions of each. A slight excess of either component may be used depending on whether a preponderance of alcoholic or acidic terminal groups is desired in the final resin. A large excess of either component will drastically reduce the number average molecular weight of the resin.

The dihydric alcohols which may be used are the saturated glycols such as ethylene glycol, diethylene glycol, triethylene glycol, propylene glycol, butanediol-2,3 and the unsaturated glycols such as 2-butene-1,4-diol. A mixture of glycols may be used.

The dihydric alcohols may be partially replaced by monohydric alcohols or polyhydric alcohols containing more than two hydroxyl groups. Among the polyhydric alcohols which may be used are glycerol, pentaerythritol, mannitol, sorbitol, etc. Among the monohydric alcohols which may be used are methanol, ethanol, butanol, propanol, isopropanol, isobutanol, benzyl alcohol, allyl alcohol, ethallyl alcohol, methallyl alcohol, chlorallyl alcohol, cinnamyl alcohol, etc. Two or more of the monohydric and polyhydric alcohols may be used to modify the basic polyester resin.

The unsaturated dibasic acids may be used as the acids or as the anhydrides thereof. Any unsaturated dibasic acid may be used including maleic, fumaric, itaconic, mesaconic, citraconic, methylene malonic, etc. acids. It is frequently found desirable to modify the properties of the polyester resin by substituting a saturated dibasic acid for part of the unsaturated dibasic acid. Included among the dibasic saturated acids are phthalic, mono-, di-, tri- or tetra-chlorophthalic, isophthalic, terephthalic, diphenic, malonic, methyl malonic, succinic, glutaric, chloromaleic, acetyl malonic, adipic, sebacic acids or anhydrides. Furthermore, a minor proportion of the acidic component may be a saturated or unsaturated monobasic acid such as acetic, propionic, butyric, benzoic, acrylic, methacrylic, crotonic, cinnamic, etc. acids or the anhydrides thereof, oil acids, such as tung oil acids, linseed oil acids, soya bean oil acids, perilla oil acids, etc.

The ratio of alcoholic component to acidic component generally is 50–50 based on the available reactive groups, i. e., the number of hydroxyl groups should be approximately equal to the number of carboxyl groups. If alcohols other than the dihydric alcohols are used, the amount of the latter will be reduced in proportion to the number of hydroxyl radicals in substituent alcohols. If polyhydric alcohols are used to partially replace the dihydric alcohols, they may be employed in quantities ranging from about 0.1 to about 5.0 mol %. The amount of monohydric alcohol substituent may vary from about 2 to about 7 mol %.

An even wider latitude in proportions may be used in the case of the acids. The amount of unsaturated dibasic acid may be varied from about 1 to about 50 mol %. The saturated dibasic acid component may vary from 0 to about 49 mol %. The amount of monobasic acid will vary from about 2 to about 7 mol %. In some cases it may be desirable to use a polybasic acid containing more than two acid groups such as aconitic, tricarballylic or citric acid in a range varying from about 0.1 to about 5.0 mol %.

The acidic and alcoholic components are reacted together at elevated temperatures ranging from about 150 to about 250° C. using an inert gas such as nitrogen or carbon dioxide to exclude air and aid in the removal of water. The condensation products are liquid resins, the properties of which are determined by the amounts and nature of the various components.

To the liquid resins are then added unsaturated polymerizable compounds such as vinyl, allyl, acrylic and vinylidene derivatives. Among the unsaturated polymerizable compounds which may be used are: vinyl esters including vinyl acetate, vinyl propionate, vinyl butyrate, vinyl benzoate, vinyl enanthate, vinyl pelargonate, vinyl chloracetate, vinyl chlorbenzoate; vinyl aromatic compounds including styrene, nuclearly substituted styrenes such as mono and polychloro styrenes, mono and poly nitro styrenes, mono and poly alkyl styrenes; side chain substituted styrenes, such as $\alpha$-methyl or other $\alpha$-alkyl styrenes, vinyl naphthalene; allyl compounds including allyl esters such as allyl acetate, allyl butyrate, allyl benzoate, diallyl phthalate, diallyl succinate, diallyl oxalate, diallyl sebacate, diallyl adipate, diallyl azeleate, diallyl maleate, diallyl terephthalate, triallyl citrate and the corresponding methallyl and ethallyl and chlorallyl esters; acrylic compounds including the esters, amides, and nitriles of acrylic and $\alpha$-alkyl or $\alpha$-aryl acrylic acids such as ethyl, methyl, butyl, phenyl and cyclohexyl esters of acrylic, methacrylic and $\alpha$-phenyl acrylic acids, etc. The amount of polymerizable unsaturated monomer used will depend on several factors including the volatility of the monomer, the reactivity of the monomer and the solubility of the monomer in the polyester resin. Generally the amount of polymerizable unsaturated monomer is equivalent to or preferably in slight excess of the amount of available unsaturation in the polyester resin on a molar basis.

In order to facilitate the cure of the polyester resins modified with the polymerizable unsaturated monomer, a polymerization catalyst is added to the mixture. Any of the conventional peroxide catalysts may be used including benzoyl peroxide, acetyl peroxide, dialkyl peroxides such as di(tertiary butyl) peroxide, diethyl peroxide, etc. It is preferred to use di(tertiary butyl) peroxide in amounts ranging from 1 to 2% based on the weight of the total resin to be foamed. However, other polymerization catalysts may be used in amounts up to about 5%.

The resinous mixtures thus compounded and containing unsaturated polyester resin, polymerizable unsaturated monomer and polymerization catalyst have a tendency to cure or polymerize at room temperature. To prevent premature gelation, a small amount ranging from about 0.005 to 0.05% by weight of a polymerization inhibitor such as paraquinone may be added.

To obtain a solid foam from the unsaturated polyester resins described above, a monoacyl azide is incorporated in the mixture which is then heated to simultaneously foam and cure the resin. The acyl azides used must be stable at ordinary temperatures, i. e., from 20 to 50° C. Among the monoacyl azides which may be used are 2-furoyl azide, cinnamoylazide, 2-furyl acrylyl azide, sorbyl azide, etc. After incorporation of the azide in the resin mixture, the temperature of the mixture is raised to 80 to 175° C., resulting in decomposition of the azide, foaming of the resin and curing of the resin while in the foam state.

The monoacyl azides have many advantages as foaming agents for the modified unsaturated polyester resins of this invention. They are soluble in the resins at room temperature, making their incorporation into the resin a simple and efficient process. They release a relatively large amount of inert gas on decomposition, i. e., 1 mol of nitrogen per mol of azide. The remaining decomposition product is an isocyanate which enters into reaction with the resin producing more inert gas (carbon dioxide) and increasing the moisture resistance, hardness and heat resistance of the resin.

The quality of the foams produced by this process depends considerably on the viscosity and curing rate of the resins at the foaming temperature. These properties may be controlled by varying the composition of the resin. For example, the use of trihydric alcohols or tribasic acids in small quantities increases the viscosity of the resin and the use of highly active unsaturated monomers speeds up the cure of the resin.

However, the quality of the foams may be made less dependent on the viscosity and curing properties of the resin by two further additions to the resin mixture. In the first place, a small quantity ranging from about 0.0001 to about 0.25% of a lecithin or cephaline such as the soya lecithin shown in the examples will act to stabilize the bubbles at the foaming temperature and insure the curing of the resin while in the foamed state and before the bubbles produced collapse. Metal soaps such as aluminum stearate, aluminum laurate, zinc stearate, etc. may be used to increase the effectiveness of the lecithin.

Secondly, a small amount of picric acid ranging from about 0.001 to about 0.05% may be used to further control the cure rate and insure the production of stable uniform foam structures.

Various conventional additives such as foliated glass fines, mica, fibres, fillers, pigments, dyes, lubricants, etc. may be mixed with the resin prior to the foaming and curing step.

The foam resins produced by the process of this invention may have an average cell diameter ranging from about 0.5 to about 1.5 mm. and are uniform in structure. The density of the foams may be varied almost at will by varying the amount of monoacyl azide used. This amount may vary from about 0.1 to about 10% by weight based on the resin mixture with the density of the completed product decreasing with increasing amounts of monoacyl azide. An amount of monoacyl azide ranging from about 1 to about 5% is preferred and will yield cellular products covering a wide range of practical applications.

The foaming and curing of the resins may be carried out in open or closed molds depending on the shape and properties desired in the final product.

The monoacyl azides make it possible to produce cellular products from unsaturated polyester resins which have a very low density and uniform cell structure. Moreover, they provide a method for controlling the porosity and density of the cellular products.

Another advantage of the monoacyl azides as foaming agents for unsaturated polyester resins is that their decomposition products tend to toughen the cellular products and increase the stability of the resins.

The physical properties of the foamed resins of this invention may be varied from hard and tough to soft and resilient as required and the resins may be rendered fire resistant by using chlorinated phthalic acids as one of the resin components. They may be used as insulating media and as the buoyant element in life preservers, life boats, jackets, etc.

The term foam resin used in this application is intended to cover cellular, porous or spongy resins produced by developing bubbles in the resins and curing the resins without destroying the bubbles.

My copending application S. N. 25,092, filed May 4, 1948, discloses and claims the preparations of resinous foams employing organic azides as blowing agents. The subject matter of this invention is disclosed in part but is not specifically claimed in S. N. 25,092.

It is obvious that many variations may be made in the products and processes of this invention without departing from the spirit and scope thereof as defined in the appended claims.

What is claimed is:

1. A process which comprises heating at 80 to 175° C., a composition comprising 100 parts of a mixture of an unsaturated polyester resin derived from a dihydrate alcohol and an alpha, beta-ethylenically unsaturated dicarboxylic acid with a vinylidene monomer copolymerizable therewith and from 0.1 to 10 parts of a monoacyl azide which is stable at temperatures ranging fom 20 to 50° C. but which decomposes readily at 80 to 175° C.

2. A foam resin made by the process of claim 1.

3. A process as in claim 1 wherein the monoacyl azide is cinnamoyl azide.

4. A foam resin made by the process of claim 3.

5. A process as in claim 1 wherein the monoacyl azide is furoyl azide.

6. A foam resin made by the process in claim 5.

7. A composition comprising 100 parts of a mixture of an unsaturated polyester resin derived from a dihydric alcohol and an alpha, beta-ethylenically unsaturated dicarboxylic acid with a vinylidene monomer copolymerizable therewith, from 1 to 5 parts of a polymerization catalyst and from 0.1 to 10 parts of a monoacyl azide which is stable at 20 to 50° C. but which decomposes readily at 80 to 175° C.

8. A composition as in claim 7 wherein the monoacyl azide is cinnamoyl azide.

9. A composition as in claim 7 wherein the monoacyl azide is furoyl azide.

JOHN B. OTT.

REFERENCES CITED

The following references are of record in the file of this patent:

UNITED STATES PATENTS

| Number | Name | Date |
| --- | --- | --- |
| 2,195,362 | Ellis | Mar. 26, 1940 |
| 2,442,330 | Fuller | June 1, 1948 |